United States Patent

Diehl et al.

Patent Number: 5,260,179
Date of Patent: Nov. 9, 1993

[54] PHOTOGRAPHIC ELEMENTS CONTAINING IMINE DYES

[75] Inventors: Donald R. Diehl; Margaret J. Helber, both of Rochester, N.Y.; Hugh Williamson, London, United Kingdom

[73] Assignee: Eastman Kodak Company, Rochester, N.Y.

[21] Appl. No.: 945,804

[22] Filed: Sep. 16, 1992

[51] Int. Cl.⁵ .............................................. G03C 1/84
[52] U.S. Cl. .................................. 430/522; 430/512; 430/517
[58] Field of Search ................ 430/510, 512, 517, 522

[56] References Cited

U.S. PATENT DOCUMENTS

| | | |
|---|---|---|
| 3,595,863 | 7/1971 | Coates et al. |
| 3,597,434 | 8/1971 | Weaver |
| 3,637,395 | 1/1972 | Jeffreys et al. |
| 3,652,288 | 3/1972 | Fumia et al. |
| 3,655,392 | 4/1972 | Fumia et al. |
| 3,671,648 | 6/1972 | Fumia et al. |
| 3,672,905 | 6/1972 | Jeffreys et al. |
| 3,774,122 | 11/1973 | Webster |
| 3,786,046 | 1/1974 | Fumia et al. |
| 3,879,434 | 10/1967 | Weaver |
| 3,915,715 | 10/1975 | Millikan et al. |
| 4,006,178 | 2/1977 | Stagi et al. |
| 4,167,490 | 9/1979 | Looney |

FOREIGN PATENT DOCUMENTS

| | | |
|---|---|---|
| 2246437 | 3/1973 | Fed. Rep. of Germany |
| 2717599 | 11/1977 | Fed. Rep. of Germany |
| 2910662 | 9/1979 | Fed. Rep. of Germany |
| 3344201 | 6/1985 | Fed. Rep. of Germany |
| 3427200 | 1/1986 | Fed. Rep. of Germany |
| 3503705 | 8/1986 | Fed. Rep. of Germany |
| 1549583 | 12/1968 | France |
| 221191 | 4/1985 | German Democratic Rep. |
| 222321 | 5/1985 | German Democratic Rep. |
| 145954 | 1/1979 | India |
| 60-194189 | 10/1985 | Japan |
| 2077751 | 12/1981 | United Kingdom |

Primary Examiner—Jack P. Brammer
Attorney, Agent, or Firm—Gordon M. Stewart

[57] ABSTRACT

Imine dyes useful in photographic materials have the formula

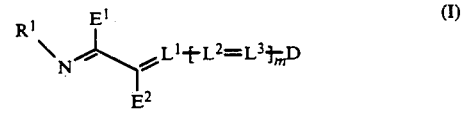

wherein D is selected from

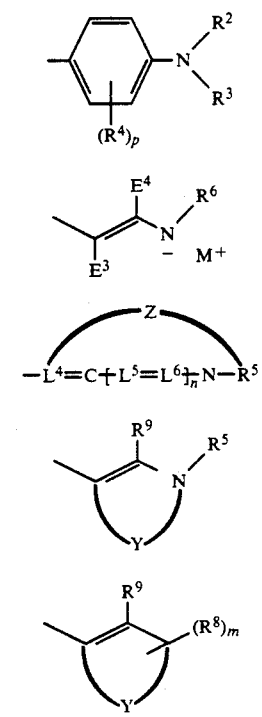

(Abstract continued on next page.)

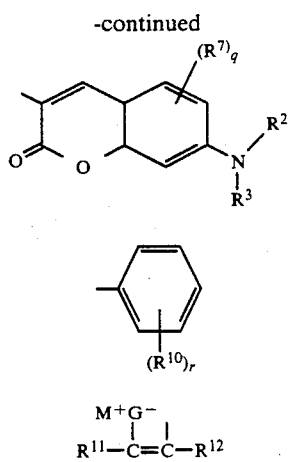

and wherein $E^1$, $E^2$, $E^3$, and $E^4$ each individually represents strongly electron-withdrawing groups; $R^1$ and $R^6$ each individually represents an alkyl group of 1 to about 8 carbon atoms, or an aralkyl or cycloalkyl group of 5 to about 10 carbon atoms, or an aryl group of 6 to about 14 carbon atoms; $R^2$, $R^3$, and $R^{11}$ each individually represents an alkyl group of 1 to about 8 carbon atoms, or an alkenyl group of 2 to about 8 carbon atoms, or an aryl, aralkyl, or cycloalkyl group of 5 to about 14 carbon atoms; or $R^2$ and $R^3$ individually represent the non-metallic atoms necessary to form a 5- or 6-membered fused ring with the phenyl ring to which the nitrogen is attached, or together represent the non-metallic atoms required to form a 5- or 6-membered ring with each other; $R^4$, $R^7$, $R^8$, $R^9$, and $R^{10}$ each individually represents hydrogen, or an alkyl, aralkyl, cycloalkyl, alkoxy, alkylamino, or alkylthio group of 1 to about 10 carbon atoms; $R^5$ represents an alkyl group of 1 to about 8 carbon atoms, or an aralkyl or cycloalkyl group of 5 to about 10 carbon atoms; $R^{12}$ represents cyano, or an aryl, aminocarbonyl, or alkoxycarbonyl group of 2 to about 8 carbon atoms, or an alkylsulfonyl, arylsulfonyl, or sulfamoyl group of 1 to about 8 carbon atoms; or $R^{11}$ and $R^{12}$ together represent the non-metallic atoms necessary to complete a substituted or unsubstituted ring system containing at least one 5- or 6-membered heterocyclic or unsaturated alicyclic nucleus; G represents O or $C(CN)_2$; Y and Z each individually represents the non-metallic atoms necessary to complete a substituted or unsubstituted ring system containing at least one 5- or 6-membered heterocyclic nucleus; $M^+$ is a cation; $L^1$ through $L^6$ each individually represents unsubstituted or substituted methine groups; m is 0, 1, 2, or 3; n is 0 or 1; p is 0, 1, 2, 3, or 4; q is 0, 1, 2, or 3; and r is 0, 1, 2, 3, 4, or 5.

Solid particle dispersions of dyes of formula (I) that contain at least one base-ionizable functional group such as carboxy, sulfonamido, or sulfamoyl are useful as filter dyes in photographic elements.

17 Claims, No Drawings

PHOTOGRAPHIC ELEMENTS CONTAINING IMINE DYES

FIELD OF THE INVENTION

This invention relates to dyes and, more particularly, to novel imine dyes that are useful in photographic materials.

BACKGROUND OF THE INVENTION

Although the variety of dyes and pigments known in the art is very wide, there is a continuing effort by synthetic dye chemists to discover new chromophoric systems for use as colorants in a broad range of applications. These applications include: textile dyes, hair dyes, paint pigments, printing inks, rubber and plastic colorants, polymer stabilizers, electrochromic and thermochromic display devices, laser dyes, electrophotographic pigments, sensitizing image, and filter dyes for photographic systems, liquid crystal display devices, optical disks, biological stains, and others.

A wide variety of dyes is employed in photographic materials. In addition to the diverse dyes used to form images in color photographic elements, spectral sensitizing dyes are used to extend the sensitivity of silver halides, which are inherently sensitive only to blue light, to other wavelengths of radiation. Among the dyes commonly employed for this purpose are the cyanines and merocyanines, which are discussed in T. H. James, ed., *The Theory of the Photographic Process*, 4th Ed., Macmillan, New York, 1977, Chapter 8, and in F. M. Hamer, *Cyanine Dyes and Related Compounds*, Wiley, New York, 1964.

Dyes are also used in color photographic materials as filters, typically located in overcoats or interlayers, to absorb incident radiation and improve image sharpness. In addition to the previously mentioned cyanines and merocyanines, various oxonol and arylidene dyes are frequently utilized for this purpose. A discussion of arylidene dyes can be found in K. Venkataraman, *The Chemistry of Synthetic Dyes*, Academic Press, New York, 1970, Vol. III.

Enamine structures are the tautomeric forms of imines, as shown below:

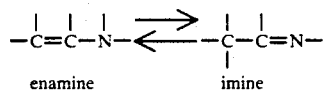

enamine      imine

In general, the imine is the predominant form; a stable enamine usually requires that there be no hydrogen substituent on the nitrogen atom (see J. March, *Advanced Organic Chemistry*, 3rd Ed., Wiley, New York, 1985, pages 69–70).

Many examples of cyanine and merocyanine dyes containing enamine substitutents are known in the art. U.S. Pat. No. 3,637,395, for example, discloses cyanine and merocyanine dyes containing cyclic enamine groups with the nitrogen at a bridgehead. Cyanine dyes containing enamines substituted with a cyclohexene ring are disclosed in U.S. Pat. No. 3,652,288, and pyrrolidinylenamine derivatives are described in U.S. Pat. No. 3,655,392. Also, U.S. Pat. No. 3,671,648 discloses tricarbocyanine dyes that contain enamine and enaminium salt groups and are useful as spectral sensitizers and filter dyes. U.S. Pat. No. 3,774,122 discloses dye lasers that contain solutions of bridged enamine cyanine dyes. Other cyanine dyes derived from enamines are described in U.S. Pat. Nos. 3,672,905, 3,786,046, and 3,915,715.

Arylidene dyes contain ethylene groups that typically are substituted at the terminal carbon atom with two strongly electron-withdrawing substituents containing multiple-bonded electronegative atoms. These substituents, which are discussed in the previously mentioned March, *Advanced Organic Chemistry*, pages 237–239, include cyano, acyl, aminocarbonyl, alkoxycarbonyl, and alkylsulfonyl, among others. In many arylidene dyes known in the art, both terminal substituents are cyano, as disclosed, for example, in U.S. Pat. No. 4,006,178, DE 2,246,437 (C.A. 78:159283b) and DD 222321 (C.A. 104:131452n). Other arylidene dyes containing various strongly electron-withdrawing substituents in addition to cyano on the terminal carbon atom are disclosed in U.S. Pat. No. 3,595,863, GB 2,077,751 (C.A. 96:182763p), DE 2,910,662 (C.A. 92:24254m), and DE 3,427,200 (C.A. 105:210403w). U.S. Pat. Nos. 3,597,434 and 3,879,434 disclose bis-methine dyes.

Arylidene dyes containing three strongly electron-withdrawing ethylenic substituents are disclosed in U.S. Pat. No. 4,167,490. Tricyanosubstituted methine dyes are described in JP 60/194189 (C.A. 104:150738b).

Fluorescent iminocoumarin dyes substituted on the nitrogen atom with an ethylenic moiety containing strongly electron-withdrawing groups are disclosed in DE 2,717,599 (C.A. 88:75311c) and IN 145954 (C.A. 92:148518v). Similar N-(β,β-dicyanovinyl) iminocoumarin dyes are disclosed in DD221,191 (C.A. 104:111374k). FR 1,549,583 (C.A. 72:22587k) describes anthraquinone dyes containing tricyanovinylamino substituents.

We have now unexpectedly found that dye compounds with new chromophoric systems can be produced from certain novel activated enamine compounds, as described herein. Variations in the substituents in these dye compounds allow modifications of their hue and absorbance over a wide range. Furthermore the incorporation of base-ionizable substituents makes them especially suitable for use as filter dyes in photographic elements.

BRIEF SUMMARY OF THE INVENTION

The dyes of the present invention have the formula

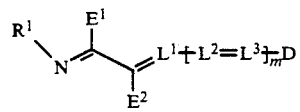

wherein D is selected from

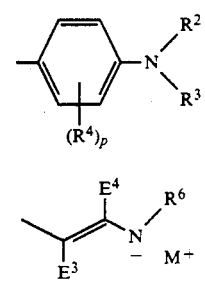

-continued

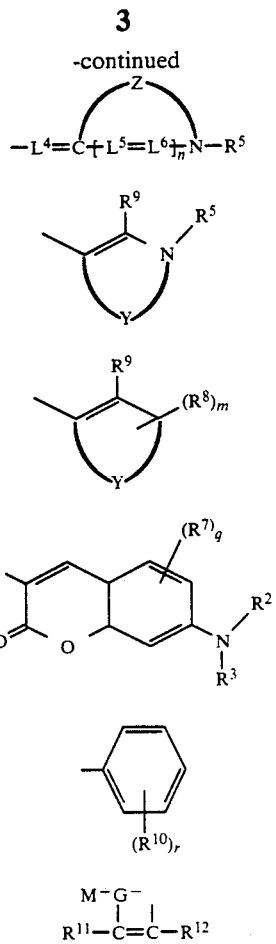

and wherein $R^1$, $E^2$, $E^3$, $E^4$ each individually represents strongly electron-withdrawing groups; $R^1$ and $R^6$ each individually represents an alkyl group of 1 to about 8 carbon atoms, or an aralkyl or cycloalkyl group of 5 to about 10 carbon atoms, or an aryl group of 6 to about 14 carbon atoms; $R^2$, $R^3$, and $R^{11}$ each individually represents an alkyl group of 1 to about 8 carbon atoms, or an alkenyl group of 2 to about 8 carbon atoms, or an aryl, aralkyl, or cycloalkyl group of 5 to about 14 carbon atoms; or $R^2$ and $R^3$ individually represents the non-metallic atoms necessary to form a 5- or 6-membered fused ring with the phenyl ring to which the nitrogen is attached, or together represent the non-metallic atoms required to form a 5- or 6-membered ring with each other; $R^4$, $R^7$, $R^8$, $R^9$, and $R^{10}$ each individually represents hydrogen, or an alkyl, aralkyl, cycloalkyl, alkoxy, alkylamino, or alkylthio group of 1 to about 10 carbon atoms; $R^5$ represents an alkyl group of 1 to about 8 carbon atoms, or an aralkyl or cycloalkyl group of 5 to about 10 carbon atoms; $R^{12}$ represents cyano, or an aryl, aminocarbonyl, or alkoxycarbonyl group of 2 to about 8 carbon atoms, or an alkylsulfonyl, arylsulfonyl, or sulfamoyl group of 1 to about 8 carbon atoms; or $R^{11}$ and $R^{12}$ together represent the non-metallic atoms necessary to complete a substituted or unsubstituted ring system containing at least one 5- or 6-membered heterocyclic or unsaturated alicyclic nucleus; G represents O or $C(CN)_2$; Y and Z each individually represents the non-metallic atoms necessary to complete a substituted or unsubstituted ring system containing at least one 5- or 6-membered heterocyclic nucleus; $M^+$ is a cation; $L^1$ through $L^6$ each individually represents unsubstituted or substituted methine groups; m is 0, 1, 2, or 3; n is 0 or 1; p is 0, 1, 2, 3, or 4; q is 0, 1, 2, or 3; and r is 0, 1, 2, 3, 4, or 5.

Solid particle dispersions of dyes of formula (I) that contain at least one base-ionizable functional group such as carboxy, sulfonamido, or sulfamoyl are useful as general purpose filter dyes, alone or in combination with other filter dyes, in photographic elements. They are insoluble at typical coating and storage pH's but are fully solubilized and hence removable during photographic processing.

DETAILED DESCRIPTION OF THE INVENTION

In the dyes of the present invention having the formula (I) as shown above, $E^1$, $E^2$, $E^3$ and $E^4$ each individually represents strongly electron-withdrawing groups that contain multiple-bonded electronegative atoms, such as cyano, acyl, aminocarbonyl, alkoxycarbonyl, alkylsulfonyl, and the like. Such electron-withdrawing substituents are discussed in the previously mentioned March, *Advanced Organic Chemistry*, pages 237–239, which is incorporated herein by reference. In a preferred embodiment, $E^1$ through $E^4$ are cyano.

In formula (I), $R^1$ and $R^6$ each individually represents a substituted or unsubstituted aryl, alkyl, aralkyl, or cycloalkyl group; $R^2$, $R^3$, $R^{11}$ each individually represents a substituted or unsubstituted alkyl, alkenyl, aryl, aralkyl, or cycloalkyl group; $R^4$, $R^7$, $R^8$, $R^9$, and $R^{10}$ each individually represents hydrogen, or a substituted or unsubstituted alkyl, aralkyl, or cycloalkyl group, or an alkoxy, alkylamino, or alkylthio group; $R^5$ represents a substituted or unsubstituted alkyl, aralkyl, or cycloalkyl group. Examples of unsubstituted alkyl groups are methyl, ethyl, propyl, isopropyl, butyl, isobutyl, t-butyl, pentyl, hexyl, octyl, 2-ethylhexyl, and the like. Cycloalkyl groups can be cyclopentyl, cyclohexyl, 4-methylcyclohexyl, and the like. Alkenyl groups can be vinyl, 1-propenyl, 1-butenyl, 2-butenyl, and the like. Aryl groups can be phenyl, naphthyl, styryl, and the like. Aralkyl groups can be benzyl, phenethyl, and the like. Useful substituents include halogen, alkoxy, acyl, alkoxycarbonyl, aminocarbonyl, carbonamido, carboxy, sulfamoyl, sulfonamido, sulfo, nitro, and the like.

The atoms represented by Y and Z can complete a 5- or 6-membered heterocyclic nucleus such as pyrazole, pyrazine, pyrrole, furan, thiophene, and the like, which can be fused with additional substituted or unsubstituted rings such as a benzo ring. Suitable heterocyclic nuclei are of the type commonly used in sensitizing dyes and are well known in the art. Many are described, for example, in the previously mentioned James, *The Theory of the Photographic Process*, 4th Ed., pages 195–203, incorporated herein by reference. Useful heterocyclic nuclei include thiazole, selenazole, oxazole, imidazole, indole, benzothiazole, benzindole, naphthothiazole, naphthoselenazole, naphthoxazole, naphthothiazole, and the like. In a preferred embodiment, Z represents the atoms necessary to complete a substituted or unsubstituted benzoxazole or benzothiazole nucleus.

Active methylene moieties, as represented by

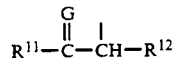

in formula (I), where G represents O, are well known in the art and are described, for example, in the previously mentioned Hamer, *Cyanine Dyes and Related Com-*

*pounds*, pages 469-494 and 595-604, which are incorporated herein by reference. In accordance with the present invention, preferred active methylene groups include those derived from benzoylacetonitrile, 2-pyrazolin-5-one, pyrazolindione, barbituric acid, rhodanine, indanedione, isoxazolinone, benzofuranone, chromandione, cyclohexanedione, dioxanedione, furanone, isoxazolidindione, pyrandione, pyrrolinone, and tricyanopropene ($R^{12}=CN$, $G=C(CN)_2$).

$M^+$ is a cation such as $Et_3NH^+$, $C_5H_5NH^+$, $Na^+$, $K^+$, and the like.

$L^1$ through $L^6$ are independently unsubstituted or substituted methine groups, $-CR^{13}$, where $R^{13}$ represents hydrogen, or a substituted or unsubstituted alkyl, alkenyl, aryl, aralkyl, or cycloalkyl group, as described above for $R^2$, $R^3$, and $R^{11}$.

The dyes of the present invention can be prepared through an intermediate nucleophilic enamine compound

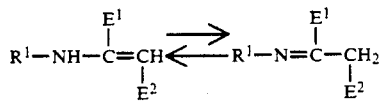

where $R^1$, $E^1$, and $E^2$ are as previously defined.

In a preferred embodiment, $R^1$ is a substituted or unsubstituted aryl group Ar, and both $E^1$ and $E^2$ are cyano:

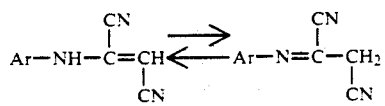

The enamine compound undergoes a condensation reaction with an electrophilic compound containing a leaving group LG to produce the dyes of the invention:

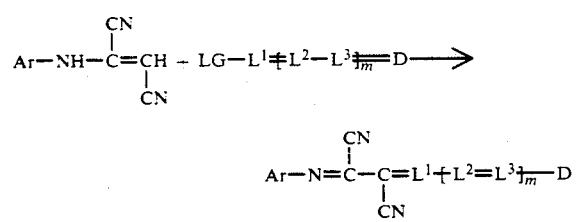

Suitable leaving groups LG include anilino, acetamido, alkoxy, hydroxy, and the like. These nonoxidative condensation reactions, which are well known in the sensitizing dye art, are discussed in the previously mentioned James, *The Theory of the Photographic Process*, pages 206-211, incorporated herein by reference.

Reaction of two molecules of the enamine compound with one of an electrophilic reagent produces certain symmetrically substituted dyes of the present invention, viz.:

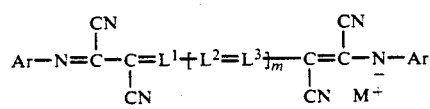

We have named the imine dyes of the present invention "iminocyanines", "iminoarylidenes", "iminides", and "iminols", as nitrogen analogs of their oxygen counterparts: merocyanine, arylidene, and oxonol dyes. Dyes of the type we have termed iminocyanines are listed in Table 1, and those we have called iminoarylidenes are shown in Table 2. Those dyes called iminides and iminols are shown in Table 3. In addition to the structures listed in the tables, dyes with other substituents and functional groups included within the scope of formula (I) are contemplated and can be obtained by synthetic procedures analogous to those described in the examples given below.

TABLE 1

Iminocyanines

Dye 1

Dye 2

Dye 3

Dye 4

Dye 5

Dye 6

TABLE 1-continued
Iminocyanines
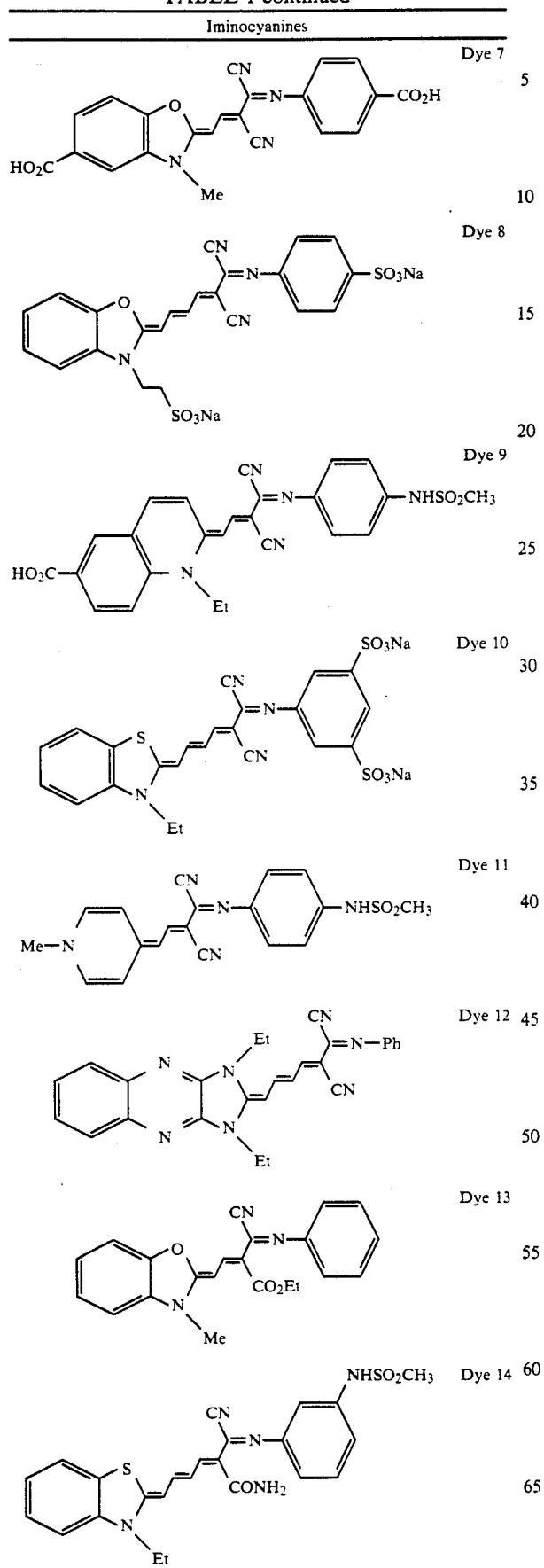
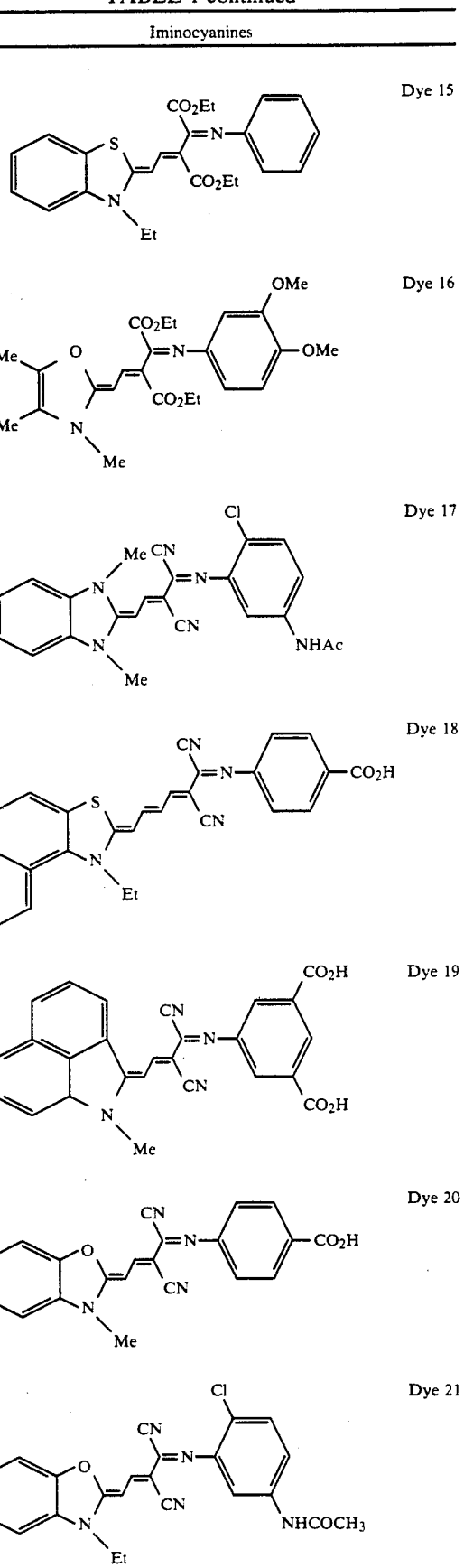

TABLE 1-continued
Iminocyanines
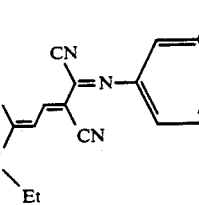
Dye 22
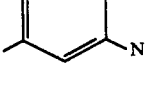
Dye 23
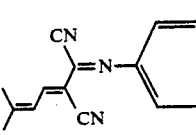
Dye 24
Dye 25
Dye 26
Dye 27
Dye 28
Dye 29
Dye 30
Dye 31
Dye 32
TABLE 2
Iminoarylidenes
Dye 33
Dye 34
Dye 35

TABLE 2-continued
Iminoarylidenes
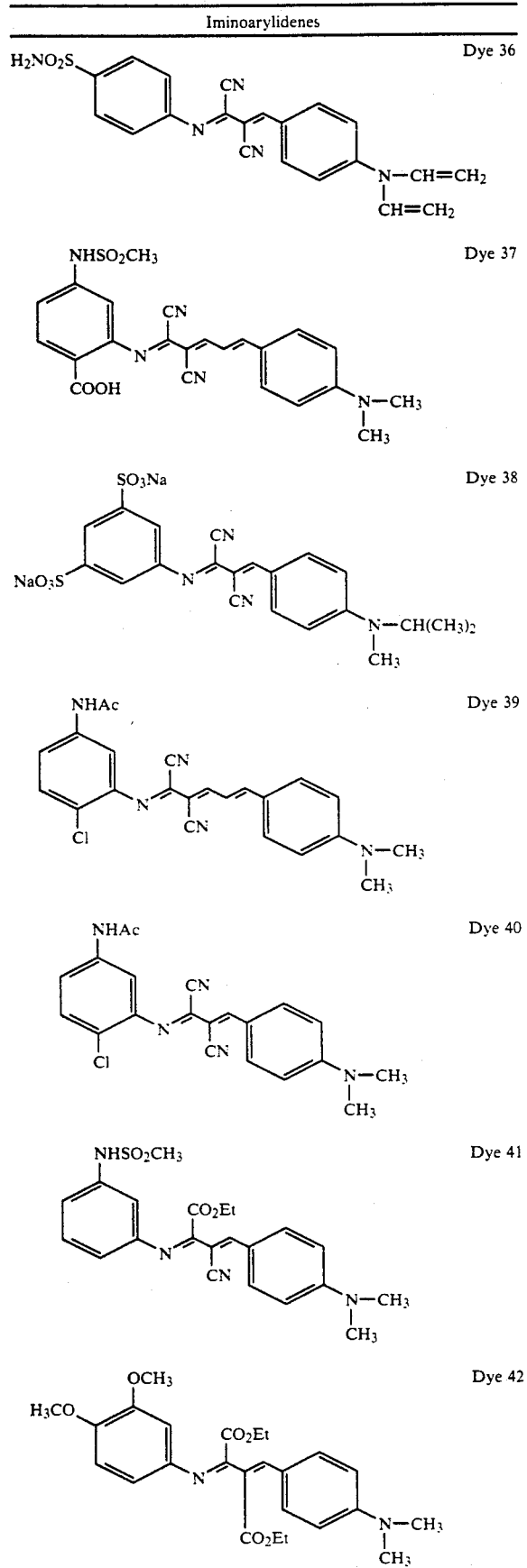
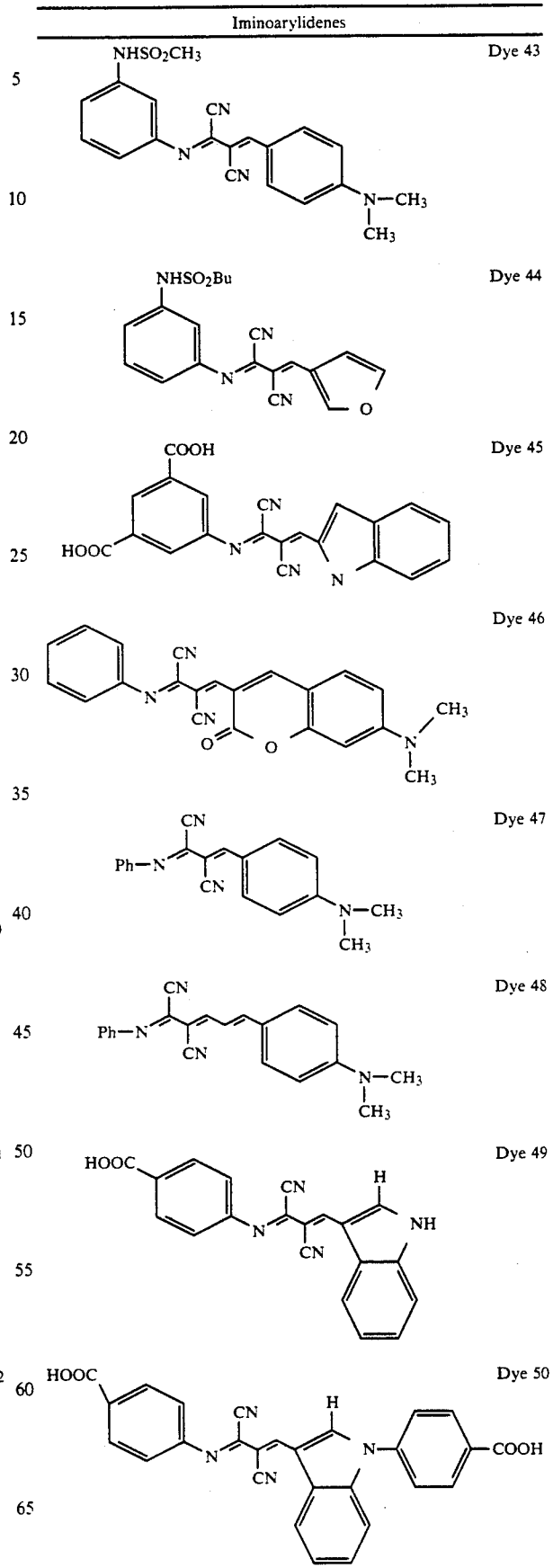

TABLE 2-continued
Iminoarylidenes
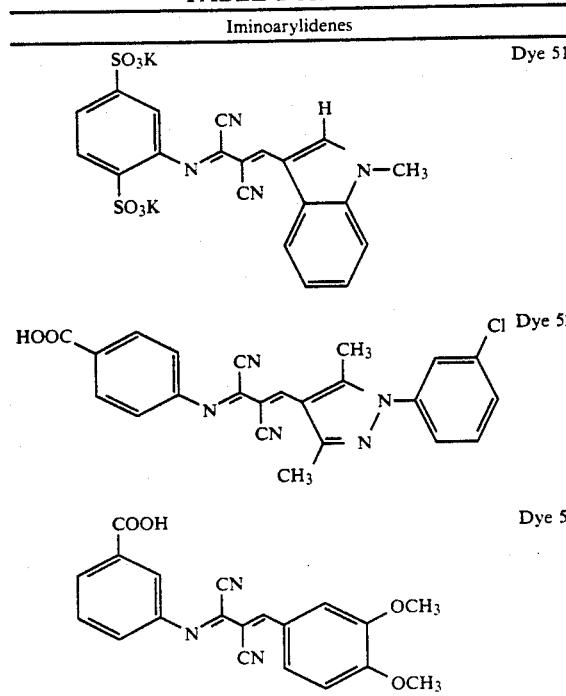
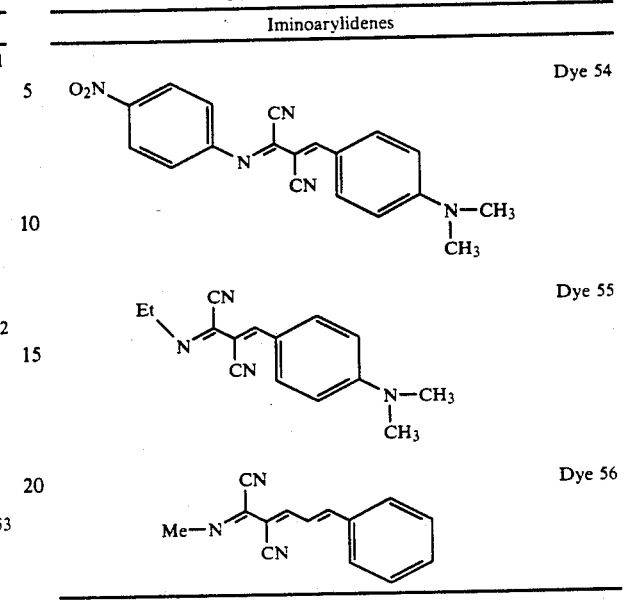
TABLE 3
Iminides/Iminols
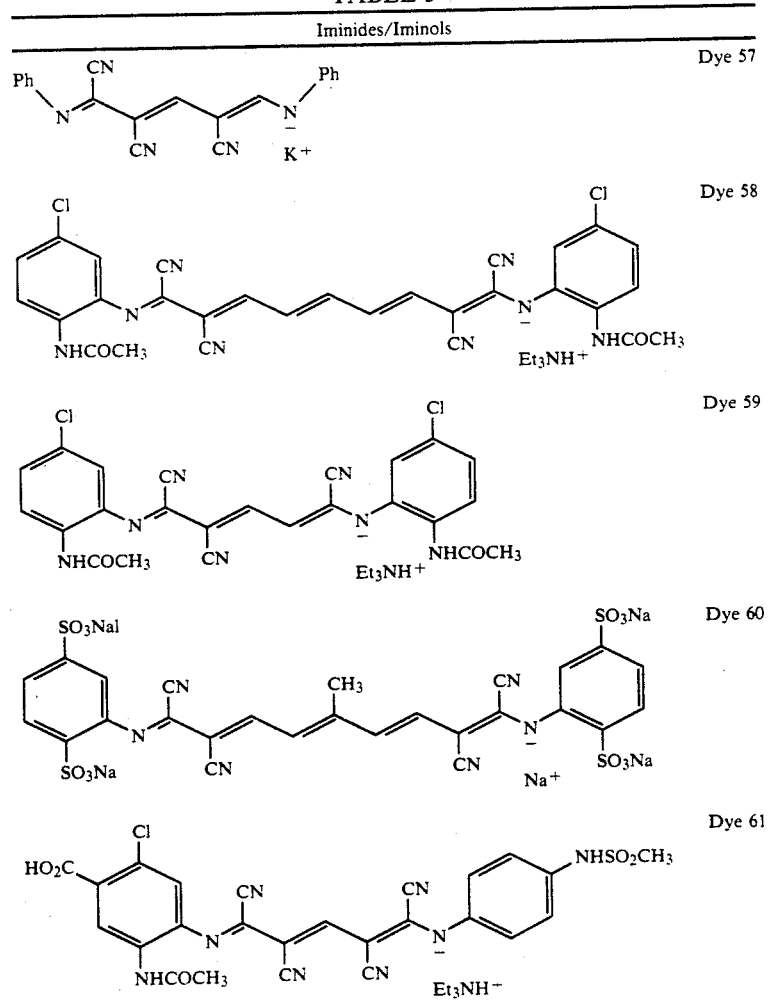

TABLE 3-continued
Iminides/Iminols
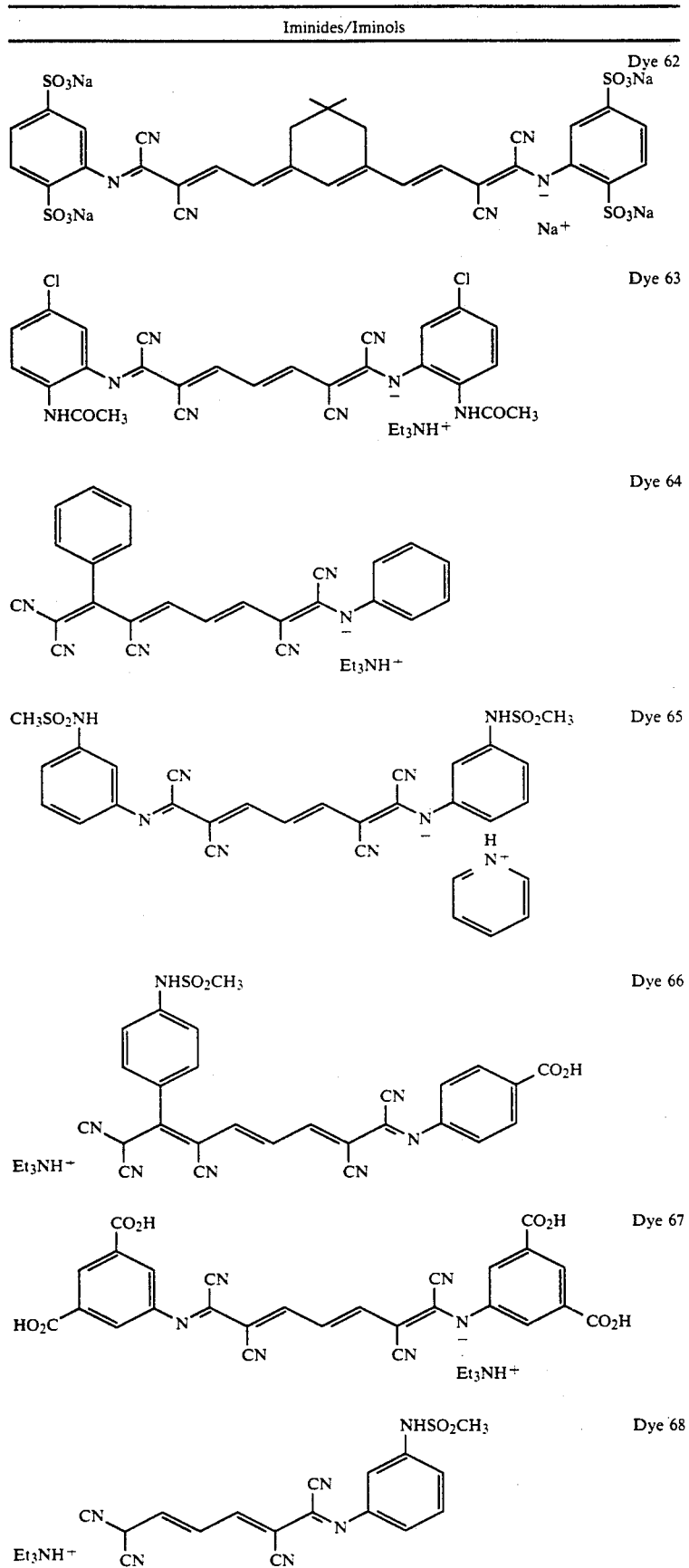

TABLE 3-continued
Iminides/Iminols

Dye 69

Dye 70

Dye 71

Dye 72

Dye 73

Dye 74

Dye 75

Dye 76

TABLE 3-continued

Iminides/Iminols

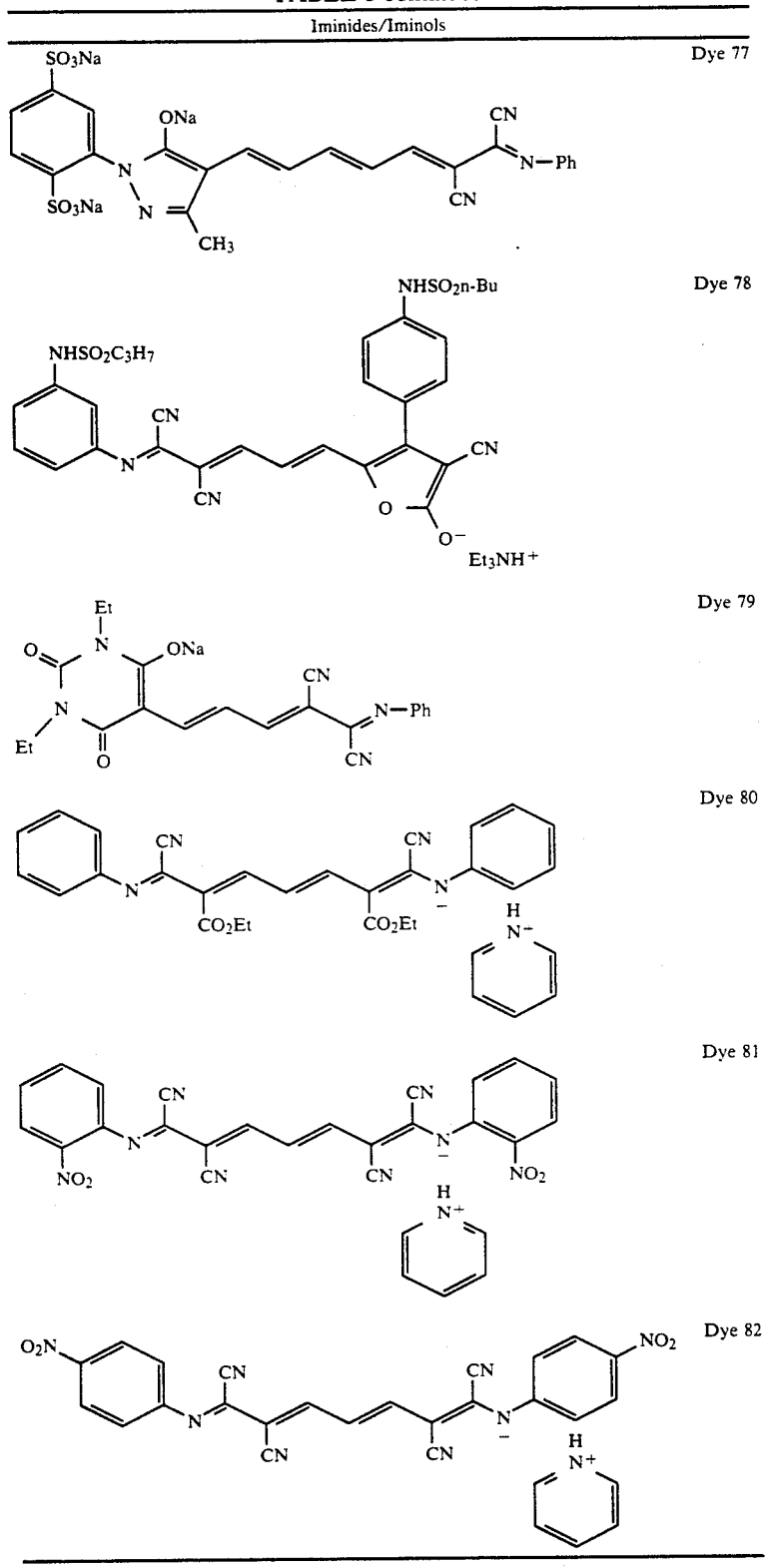

Dye 77

Dye 78

Dye 79

Dye 80

Dye 81

Dye 82

The imine dyes of the present invention are useful in a wide variety of photographic and non-photographic applications. For example, they can be incorporated in a hydrophilic layer of a photographic element in any known way (e.g., with the aid of a high-boiling non-polar organic solvent), but are preferably in the form of a solid particle dispersion (i.e., the dye is in the form of solid particles of microscopic size) for incorporation into a layer such as a hydrophilic colloid layer of a photographic element. The solid particle dispersion can be formed by precipitating the dye in the form of a dispersion and/or by well-known milling techniques, e.g., ball-milling, sand-milling, or colloid-milling (preferably ball-milling or sand-milling) the dye in the presence of a dispersing agent. The dispersion of dye particles should have a mean diameter of less than 10 μm and preferably less than 1 μm. The dye particles can be prepared in sizes ranging down to about 0.01 μm. Solid particle filter dye dispersions in photographic elements are disclosed in U.S. Pat. Nos. 4,803,150; 4,855,221; 4,857,446; 4,900,652; 4,900,653; 4,900,654; and 5,098,820, incorporated herein by reference. Solid particle dispersions of compounds of formula (I) are useful as general purpose filter dyes, alone or in combination with other filter dyes in photographic elements. They are insoluble at coating pH's of 6 or less (generally 4 to 6) and soluble at processing pH's of 8 or more (generally 8 to 12). Thus, they do not interact with other components of the photographic elements during coating or storage but are fully solubilized and hence removable during photographic processing. Specific dyes of formula (I) that are incorporated into solid particle dispersions require the presence of at least one base-ionizable functional group such as carboxy (—COOH), sulfonamido (—NHSO$_2$R$^{14}$) or sulfamoyl (—SO$_2$NHR$^{15}$) where R$^{14}$ and R$^{15}$ represent groups as defined above for R$^2$, R$^3$, and R$^{11}$. In addition, R$^{15}$ can be hydrogen. Dyes incorporated into solid particle dispersions as described above should not be substituted with strongly acidic groups such as sulfo (—SO$_3$—), which would tend to increase the solubility of the dye sufficiently to cause dissolution of the dye at pH's employed during coating of the photographic element.

Water-soluble filter dyes of the formula (I) can also be used either within a silver halide emulsion layer as an intergrain absorber, or they can be immobilized by cationic mordants in a separate layer. Dyes of formula (I) used in the latter manner would incorporate one or more solubilizing groups such as sulfo (—SO$_3$—) or sulfato (—OSO$_3$—).

The dyes may be located in any layer of the element where it is desirable to absorb light, but it is particularly advantageous to locate them in a layer where they will be solubilized and washed out during processing. Useful amounts of dye range from 1 to 1000 mg/m$^2$. The dye should be present in an amount sufficient to yield an optical density at the absorbance D-max in the visible region before processing of at least 0.10 density units and preferably at least 0.50 density units. This optical density will generally be less than 5.0 density units for most photographic applications.

The hydrophilic binder used in the present invention can be any known type, such as a hydrophilic colloid (e.g., gelatin), polyvinyl alcohol, and the like, as are well-known in the art.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymer-coated paper. Such supports are described in further detail in *Research Disclosure*, December, 1978, Item 17643 [hereinafter referred to as *Research Disclosure*, Section XVII.

The radiation-sensitive layer of the element of the invention can contain any of the known radiation-sensitive materials, such as silver halide, diazo image-forming systems, light-sensitive tellurium-containing compounds, light-sensitive cobalt-containing compounds, and others described in, for example, J. Kosar, *Light-Sensitive Systems: Chemistry and Application of Non-silver Halide Photographic Processes*, J. Wiley & Sons, N.Y. (1965).

Silver halide is especially preferred as a radiation-sensitive material. Silver halide emulsions can contain, for example, silver bromide, silver chloride, silver iodide, silver chlorobromide, silver chloroiodide, silver bromoiodide, or mixtures thereof. The emulsions can include coarse, medium, or fine silver halide grains bounded by 100, 111, or 110 crystal planes. Silver halide emulsions and their preparation are further described in *Research Disclosure*, Section I. Also useful are tabular grain silver halide emulsions, as described in *Research Disclosure*, January 1983, Item 22534 and U.S. Pat. No. 4,425,426.

The radiation-sensitive materials described above can be sensitized to a particular wavelength range of radiation, such as the red, blue, or green portions of the visible spectrum, or to other wavelength ranges, such as ultraviolet, infrared, and the like. Sensitization of silver halide can be accomplished with chemical sensitizers such as gold compounds, iridium compounds, or other group VIII metal compounds, or with spectral sensitizing dyes such as cyanine dyes, merocyanine dyes, styryl dyes, or other known spectral sensitizers. Additional information on sensitization of silver halide is described in *Research Disclosure*, Sections I-IV.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith. Color photographic elements and color-forming couplers are well-known in the art and are further described in *Research Disclosure*, Section VII.

The element of the invention can also include any of a number of other well-known additives and layers, as described in *Research Disclosure*. These include, for example, optical brighteners, antifoggants, image stabilizers, light-absorbing materials such as filter layers or intergrain absorbers, light-scattering materials, gelatin hardeners, coating aids and various surfactants, overcoat layers, interlayers and barrier layers, antistatic layers, plasticizers and lubricants, matting agents, development inhibitor-releasing couplers, bleach accelerator-releasing couplers, and other additives and layers known in the art.

The dye of formula (I) can be located in any layer of a photographic element where it is desired to absorb light. In a preferred embodiment, the dye is preferably located in a layer where it will be subjected to high pH (i.e., 8 to 12) and/or sulfite during photographic processing, so as to allow the dye to be solubilized and removed or decolorized.

The photographic elements of the invention, when exposed, can be processed to yield an image. During processing, the dye of formula (I) will generally be decolorized and/or removed. Following processing, the dye of the invention should contribute less than 0.10 density unit, and preferably less than 0.02 density unit to the absorbance D-max in the visible region in the minimum density areas of the exposed and processed element.

Processing can be by any type of known photographic processing, as described in *Research Disclosure*, Sections XIX–XXIV, although it preferably includes a high pH (i.e., 8 or above) step utilizing an aqueous sulfite solution in order to maximize decolorization and removal of the dye. A negative image can be developed by color development with a chromogenic developing agent followed by bleaching and fixing. A positive image can be developed by first developing with a non-chromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials known to be used for that purpose. Bleach baths generally comprise an aqueous solution of an oxidizing agent such as water soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The following examples further illustrate the invention.

EXAMPLE 1

Synthesis of Dye 1

Synthesis of 1-anilino-1,2-dicyanoethylene. Into a 5-L round-bottomed flask was placed 200 g (3.03 mol) malononitrile, 134 g (4.19 mol) anhydrous methanol, and 1.42 L of anhydrous diethyl ether. The flask was chilled to 0° C. in an ice/brine bath, and gaseous hydrogen chloride was bubbled in with rapid stirring at such a rate as to maintain an internal temperature below 5° C. Addition of hydrogen chloride gas was stopped when its detection at the outer vent of the reaction flask indicated it was no longer being consumed. The product mixture, a thick yellow slurry, was stirred at 10° C. for an additional 30 minutes, then filtered through a sintered glass funnel. The crude collected product was washed with diethyl ether and hexane, then dried to yield 445.7 g of crude methyl 2-cyanoacetimidate hydrochloride as a bone white solid, which was used without further purification.

In a 6-L flask was placed 444 g of crude methyl 2 2-cyanoacetimidate hydrochloride and 5.64 L of anhydrous methanol. The mixture was stirred at room temperature for 16 hours. After removal of methanol under reduced pressure, the light brown product mixture was filtered to remove the ammonium chloride by-product, and the filtrate was distilled under vacuum. The fraction boiling at 94°-96° C. (0.25 mm Hg) provided 280.4 grams (1.93 mole, 63.7% yield based upon malononitrile) of 2-cyano-1,1,1-trimethoxyethane as a colorless liquid, which was characterized by NMR spectroscopy.

In a 250-mL flask was placed 87 g (0.6 mol) of 2-cyano-1,1,1-trimethoxyethane, 46.5 g (0.5 mol) of aniline, and 1.0 g (0.005 mol) of p-toluenesulfonic acid monohydrate. The mixture was placed in a pre-heated oil bath at 120° C. and stirred rapidly. The methanol by-product of the reaction was allowed to boil off. When the internal reaction temperature reached 110° C., the reaction flask was fitted with a water aspirator vacuum take-off, and the residual methanol was removed at approximately 20 mm Hg. The crude product mixture was then distilled under high vacuum and the fraction distilling at 115°-125° C. (0.5 mm Hg) was collected to give 47.6 g (0.27 mol, 54.6% yield) of methyl 2-cyano-N-phenylacetimidate as a light yellow liquid, which was characterized by NMR and mass spectral data. HPLC analysis showed this material to be 96% pure. Elemental analysis: Calculated: C, 68.95; H, 5.79; N, 16.08. Found: C, 66.80, H, 5.72, N, 15.36.

In a 50-mL flask was placed a solution of 0.66 g of lithium cyanide (20 mmol) in 40 mL of anhydrous dimethylformamide and 1.74 g (10 mmol) of methyl 2-cyano-N-phenylacetimidate. The mixture was stirred in a stoppered flask at room temperature for 16 hours, then heated at 40° C. under vacuum (1 mm Hg) to remove dimethylformamide. To the dark residual oil was added 100 mL diethyl ether and 50 mL distilled water. The ethyl layer was separated, washed with four 50-mL portions of water, dried over MgSO$_4$, and concentrated to yield 0.36 g (21% yield) of a dark oil, which spontaneously solidified. The product was further purified by dissolving it in 30 mL carbon tetrachloride and triturating the solution with 50 ml low boiling ligroin. The resultant 0.2 g (1.18 mmol, 11.8% yield) of 1-anilino-1,2-dicyanoethylene, m.p. 123°-126° C., was characterized by NMR and mass spectral data.

Synthesis of Dye 1. In a 50-mL flask was placed 0.65 g (1.5 mmol) of 2-(2-acetanilidovinyl)-3-ethylbenzoxazolium iodide and 10 mL of anhydrous acetonitrile. Then, with stirring at room temperature, 0.25 g (1.5 mmol) of 1-anilino-1,2-dicyanoethylene and 0.33 g (3.3 mmol) of triethylamine were added. The mixture was placed in an oil bath pre-heated to 100° C. and heated rapidly to reflux. After 20 minutes the flask was removed and chilled in ice. The precipitated product was collected by filtration, washed twice with 10 mL of acetonitrile, and dried to yield 0.38 g (1.1 mmol, 74.4% yield) of crude as an orange powder. The dye was purified by slurring in refluxing ethanol. After drying, 0.30 grams (0.88 mmol, 58.7% yield) of Dye 1 was obtained as an orange powder, m.p. 265°-268° C., absorbance maximum=457 nm (methanol), extinction maximum=78,200. NMR and mass spectral data were consistent with the assigned structure. Elemental analysis: Calculated: C, 74.10; H, 4.74; N, 16.46. Found: C, 73.14; H, 4.80; N, 16.04.

EXAMPLE 2

Synthesis of Dye 2

Synthesis of 1-(3-methanesulfonamidoanilino)-1,2-dicyanoethylene. 3-Methanesulfonamidoaniline (11.7 g, 0.063 mol) and 2-cyano-1,1,1-trimethoxyethane (11.8 g, 0.082 mol) were combined in a 100-mL round-bottomed flask, and heated to 140° C. with stirring in a pre-heated oil bath until the mixture became a homogeneous melt. A few crystals of p-toluenesulfonic acid were added to the melt, causing vigorous bubbling in the reaction mixture as the methanol by-product boiled away. Heating at 140° C. continued at atmospheric pressure for 15 minutes, then under vacuum at approximately 20 mm for another 15 minutes to remove the remaining methanol. The mixture was cooled to 25° C. under vacuum to form a brown-colored glass. Trituration with anhydrous ethanol (50 mL) gradually produced a granular solid. The mixture was cooled, and the product was collected by filtration and washed with cold ethanol to yield 14.2 g (84% yield) of methyl 2-cyano-N-(3-methanesulfonamido)-phenylacetimidate as an off-white powder, m.p. 118°-120° C. The NMR and mass spectral data were consistent with the structure. Mass spectral analysis showed the product to be more than 98% pure. Elemental analysis: Calculated: C, 49.43; H, 4.90; N, 15.72; S, 12.00. Found: C, 49.44; H, 4.97; N, 15.67; S, 11.45.

Methyl 2-cyano-N-(3-methanesulfonamido)-phenylacetimidate (20 g, 0.075 mol) was dissolved in 50 mL of dimethylformamide in a 100-mL round-bottomed flask. A solution of sodium cyanide (7.3 g, 0.15 mol) in 20 mL water was added in one portion to the stirred imidate solution. The mixture was stirred at 25° C. for 2 hours, producing a black solution. The mixture was then heated to 40° C. under vacuum to reduce the total volume of the reaction by approximately two-thirds. The viscous residue was poured into 2.5 L of brine containing 60 mL concentrated HCl solution. The product was extracted from the aqueous layer with numerous portions of ethyl acetate. The combined extracts were washed with brine, dried over $MgSO_4$, and then filtered. The solvent was removed under reduced pressure, and the crude product was purified by flash chromatography, using 3:1 ethyl acetate:hexane as an eluent. Concentration of the appropriate fractions yielded a red oil that gradually crystallized when stirred in anhydrous ether. The mixture was filtered, producing 3.5 g of yellow powder. The filtrate was concentrated, chilled, and filtered to yield another 1.0 g of product for a total of 4.5 g (23% yield); m.p, 124°-126° C. The NMR and mass spectral data were consistent with the structure of the product. Elemental analysis: Calculated: C, 50.37; H, 3.84; N, 21.36; S, 12.22: Found: C, 50.18; H, 3.96; N, 21.08; S, 11.39.

Synthesis of Dye 2

1-(3-Methanesulfonamidoanilino)-2,2-dicyanoethylene (2.5 g, 0.0095 mol) and 2-(2-acetanilidovinyl)-3-ethylbenzoxazolium iodide (4.1 g, 0.095 mol) were combined in 20 mL acetonitrile, then treated with triethylamine (2.1 g, 0.02 mol) to produce a red solution. The solution was heated at reflux for 2 minutes, during which an orange precipitate began to form. The mixture was cooled to 25° C., then filtered to yield 3.2 g of salmon-colored crystals. The crude product was slurried in 15 mL of hot acetonitrile for several minutes, allowed to cool, then collected by filtration to yield 3.0 g (73% yield) of sparkling salmon-colored crystals, m.p. 235°-237° C. (dec), absorbance maximum=459 nm (MeOH), extinction maximum=78,800. The NMR and mass spectral data were consistent with the structure of the product. HPLC analysis showed that the product was more than 98% pure. Elemental analysis: Calculated: C, 60.96; H, 4.42; N, 16.16; S, 7.40: Found: C, 60.05; H, 4.45; N, 16.03; S, 7.65.

EXAMPLE 3

Synthesis of Dye 25

1-(3-Methanesulfonamidoanilino)-1,2-dicyanoethylene (2.0 g, 0.0076 mol) and 2-(2-acetanilidovinyl)-5-carboxy-3-methylbenzoxazolium p-toluenesulfonate (3.8 g, 0.076 mol) were combined in 30 mL acetonitrile, then treated with pyridine (2.4 g, 0.031 mol). The resulting red solution was heated at reflux for 2 minutes; then acetic anhydride (0.35 g, 0.038 mol) was added, and the mixture was heated at reflux for one minute more. The mixture was cooled to 0° C., and the precipitated product was collected by filtration and washed with cold acetonitrile to afford 1.2 g of a red powder. The crude product was slurried in 15 mL of refluxing ethanol, collected by filtration, and dried to yield 1.0 g (24% yield) of Dye 25 as an orange powder, m.p. 255°-256° C. (dec), absorbance maximum=458 nm ($CH_3CN$), extinction maximum=76,500. The NMR and mass spectral data were consistent with the structure of the product. HPLC analysis showed that the product was greater than 98% pure. Elemental analysis: Calculated: C, 57.01; H, 3.70; N, 15.11. Found: C, 56.65; H, 3.81; N, 14.61.

EXAMPLE 4

Synthesis of Dye 54

1-(4-Nitroanilino)-1,2-dicyanoethylene (0.5 g, 0.0023 mol) and N,N-dimethyl-4-(1,3-dioxolan-2-yl)aniline (0.5 g, 0.0026 mol) were combined with a 6 mL-portion of methanol containing a catalytic amount of concentrated HCl solution. (The methanol solution contained 2 drops of concentrated HCl solution per 50 mL of methanol). The mixture was heated at reflux for one minute, producing a deep red solution which, upon cooling to 0° C., deposited a brown precipitate. The precipitated product was collected by filtration, then purified by slurrying in refluxing methanol. Dye 54 (0.17 g, 22% yield) was isolated as a fluffy dark brown solid, m.p. 244°-245° C. (dec), absorbance maximum=481 nm ($CH_3CN$), extinction maximum=61,600. The NMR and mass spectral data were consistent with the structure of the product. HPLC analysis showed that the product was more than 99% pure. Elemental analysis: Calculated: C, 66.08; H, 4.38; N, 20.28. Found: C, 65.87; H, 4.57; N, 20.40.

EXAMPLE 5

Synthesis of Dye 73

In a 60-mL flask was placed 0.8 g (4.7 mmol) of 1-anilino-1,2-dicyanoethylene, 5 mL of pyridine, and 2.0 g (15 mmol) of 1,1,3-trimethoxypropene. The slurry was stirred at room temperature for 10 minutes, during which time the reaction color became purple. The contents of the flask were then heated to reflux and held at reflux for 5 minutes. A dark blue-purple color formed. The product mixture was then stirred at room temperature for an additional 5 minutes and finally chilled in ice for 30 minutes. A material having a dark green metallic sheen precipitated. The product mixture was treated with 40 mL of diethyl ether and the supernatant phase was decanted from the solid precipitate. This supernatant phase deposited pure crystals of Dye 73 upon standing. This product was collected and dried to give 0.05 g (0.11 mmol, 2.3% yield) of pure Dye 73 as green microcrystals, m.p. 173°-174° C., absorbance maximum=551 nm (methanol), extinction maximum=96,200, pure by HPLC analysis. NMR, IR, and mass spectral data were consistent with the assigned structure. An additional 0.07 g (0.12 g total, 0.26 mmol, 5.6% yield) of 95% pure Dye 73 was isolated from the precipitated solid product by extraction with ethyl acetate and dilution of the extract with diethyl ether.

The absorbance maximum in solution of representative examples of the dyes of the invention have been measured and are shown in Table 4 below.

| Dye No. | λmax | Solvent |
| --- | --- | --- |
| 1 | 457 nm | MeOH |
| 2 | 459 nm | MeOH |
| 21 | 457 nm | MeOH |

-continued

| Dye No. | λmax | Solvent |
| --- | --- | --- |
| 23 | 492 nm | MeOH |
| 24 | 590 nm | MeOH |
| 25 | 458 nm | MeCN |
| 26 | 490 nm | MeCN |
| 27 | 590 nm | MeCN |
| 28 | 454 nm | MeCN |
| 29 | 494 nm | MeCN |
| 30 | 458 nm | MeCN |
| 39 | 523 nm | MeOH |
| 40 | 468 nm | MeOH |
| 54 | 481 nm | MeCN |
| 58 | 650 nm | MeOH |
| 59 | 448 nm | MeOH |
| 63 | 546 nm | MeOH |
| 65 | 556 nm | MeCN |
| 73 | 552 nm | MeOH |
| 81 | 544 nm | MeCN |
| 82 | 545 nm | MeCN |

EXAMPLE 6

Use of a solid particle dispersion of Dye 25 as a filter in a photographic element A solid particle dispersion of Dye 25 was prepared by ball milling according to the following procedure. Water (21.7 mL) and a 6.7% solution of Triton X-200 ® surfactant (2.65 g) were placed in a 60-mL screw-capped bottle, and 1.00 g of Dye 25 was added. Then zirconium oxide beads (40 mL, 2 mm diameter) were added; the cap was secured, the container was placed in a mill, and its contents were milled for 4 days. The milled mixture was added to a 12.5% aqueous gelatin (8.0 g) solution. The new mixture was placed on a roller mill for 10 minutes to reduce foaming, then filtered to remove the zirconium oxide beads. The resulting dispersion of dye particles had a mean diameter less than 1.0 μm.

The solid particle dispersion of Dye 25 was coated on a polyester support according to the following procedure. A spreading agent, surfactant 10 G ®, and a hardener, bis(vinylsulfonylmethyl) ether, were added to the dye-gelatin melt prepared as described above. The resulting mixture was then coated on a poly(ethylene terephthalate) support to produce a dye coverage of 0.32 g/m², a gelatin coverage of 1.60 g/m², a spreading agent coverage of 0.096 g/m², and a hardener coverage of 0.016 g/m². The absorbance of the dispersion of Dye 25 in the element was measured with a spectrophotometer, and the λmax was determined to be 505 nm.

Identical samples of the element containing the coated dye dispersion were subjected to a 5-minute wash with distilled water and to Kodak E-6 ® processing (described in *British Journal of Photography Annual*, 1977, pages 194-197). The results were as follows:

| Optical Density at λmax (505 nm) | | |
| --- | --- | --- |
| Before processing | After distilled water wash | After E-6 ® processing |
| 0.806 | 0.794 | 0.001 |

These results show that the dispersion of the Dye 25 in the element was not significantly affected by the water wash, indicating little propensity for dye wandering at pH's typical during coating and storage, but substantially complete removal of the dye under photographic processing conditions.

The invention has been described in detail with particular reference to preferred embodiments thereof, but it will be understood that variations and modifications can be effected within the spirit and scope of the invention.

What is claimed is:

1. A photographic element comprising a support having thereon a radiation-sensitive layer and a hydrophilic layer, which is the same as or different from said radiation-sensitive layer, that contains a hydrophilic binder and a filter dye, wherein said filter dye has the formula

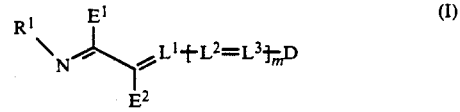

wherein D is selected from

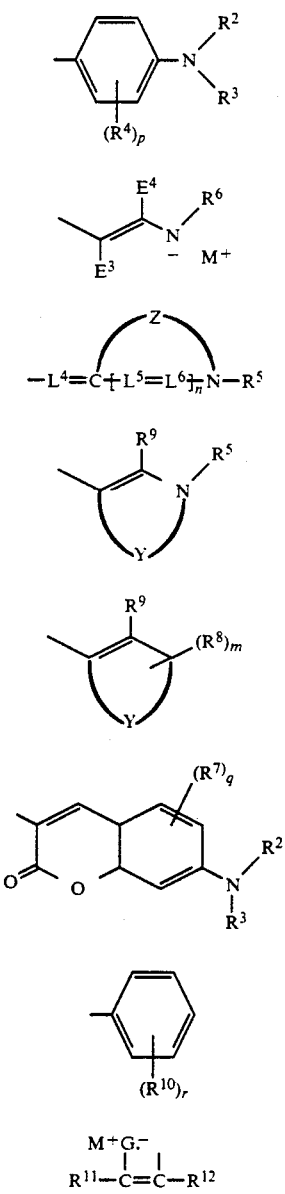

and wherein $E^1$, $E^2$, $E^3$ and $E^4$ each individually represents strongly electron-withdrawing groups; $R^1$ and $R^6$ each individually represents an alkyl group of 1 to about 8 carbon atoms, or an aralkyl or cycloalkyl group of 5 to about 10 carbon atoms, or an aryl group of 6 to about 14 carbon atoms; $R^2$, $R^3$, and $R^{11}$ each individually represents an alkyl group of 1 to about 8 carbon atoms, or an alkenyl group of 2 to about 8 carbon atoms, or an aryl, aralkyl, or cycloalkyl group of 5 to about 14 carbon atoms; or $R^2$ and $R^3$ individually represent the non-metallic atoms necessary to form a 5- or 6-membered fused ring with the phenyl ring to which the nitrogen is attached, or together represent the non-metallic atoms required to form a 5- or 6-membered ring with each other; $R^4$, $R^7$, $R^8$, $R^9$, and $R^{10}$ each individually represents hydrogen, or an alkyl, aralkyl, cycloalkyl, alkoxy, alkylamino, or alkylthio group of 1 to about 10 carbon atoms; $R^5$ represents an alkyl group of 1 to about 8 carbon atoms, or an aralkyl or cycloalkyl group of 5 to about 10 carbon atoms; $R^{12}$ represents cyano, or an aryl, aminocarbonyl, or alkoxycarbonyl group of 2 to about 8 carbon atoms, or an alkylsulfonyl, arylsulfonyl, or sulfamoyl group of 1 to about 8 carbon atoms; or $R^{11}$ and $R^{12}$ together represent the non-metallic atoms necessary to complete a substituted or unsubstituted ring system containing at least one 5- or 6-membered heterocyclic or unsaturated alicyclic nucleus; G represents O or $C(CN)_2$; Y and Z each individually represents the non-metallic atoms necessary to complete a substituted or unsubstituted ring system containing at least one 5- or 6-membered heterocyclic nucleus; $M^+$ is a cation; $L^1$ through $L^6$ each individually represents unsubstituted or substituted methine groups; m is 0, 1, 2, or 3; n is 0 or 1; p is 0, 1, 2, 3, or 4; q is 0, 1, 2, or 3; and r is 0, 1, 2, 3, 4, or 5.

2. A photographic element according to claim 1 wherein D contains at least one carboxy, sulfonamido, sulfamoyl, sulfo, or sulfato substituent.

3. A photographic element according to claim 1 wherein $R^1$ contains at least one carboxy, sulfonamido, sulfamoyl, sulfo, or sulfato substituent.

4. A photographic element according to claim 1 wherein D is an active methylene moiety derived from benzoylacetonitrile, 2-pyrazoline-5-one, pyrazolindione, barbituric acid, rhodanine, indanedione, isoxazolinone, benzofuranone, chromandione, cyclohexanedione, dioxanedione, furanone, isoxazolidindione, pyrandione, pyrrolinone, or tricyanopropene.

5. A photographic element according to claim 1 wherein Z represents the atoms necessary to complete a benzoxazole or a benzothiazole nucleus.

6. A photographic element according to claim 1 wherein $E^1$ through $E^4$ are selected from cyano, acyl, aminocarbonyl, or alkoxycarbonyl.

7. A photographic element according to claim 6 wherein $E^1$ and $E^2$ are cyano.

8. A photographic element according to claim 6 wherein $E^1$ through $E^4$ are cyano.

9. A photographic element according to claim 1 wherein $L^1$ through $L^6$ are CH.

10. A photographic element according to claim 1 wherein said filter dye is in a hydrophilic layer different from said radiation-sensitive layer, said hydrophilic layer being located on the same side of the support as said radiation-sensitive layer.

11. A photographic element according to claim 1 wherein said filter dye is in a hydrophilic layer different from said radiation-sensitive layer, said hydrophilic layer being located on the side of the support opposite to said radiation-sensitive layer.

12. A photographic element according to claim 10 wherein said filter dye is in the form of a dispersion of solid particles.

13. A photographic element according to claim 12 wherein said particles have a mean diameter from about 0.01 to 10 micrometers.

14. A photographic element according to claim 11 wherein said filter dye is in the form of a dispersion of solid particles.

15. A photographic element according to claim 14 wherein said particles have a mean diameter from about 0.01 to 10 micrometers.

16. A photographic element according to claim 10 wherein said filter dye is dissolved in said hydrophilic layer and immobilized by a cationic mordant.

17. A photographic element according to claim 11 wherein said filter dye is dissolved in said hydrophilic layer and immobilized by a cationic mordant.

* * * * *

UNITED STATES PATENT AND TRADEMARK OFFICE
CERTIFICATE OF CORRECTION

PATENT NO. : 5,260,179

DATED : November 9, 1993

INVENTOR(S) : D. R. Diehl et al

It is certified that error appears in the above-identified patent and that said Letters Patent is hereby corrected as shown below:

In column 29, line 44, delete "2-pyrazoline-5-one," and insert --2-pyrazolin-5-one,--.

Signed and Sealed this

Seventeenth Day of May, 1994

Attest:

BRUCE LEHMAN

Attesting Officer      Commissioner of Patents and Trademarks